US012589376B2

(12) United States Patent
Yoon et al.

(10) Patent No.: US 12,589,376 B2
(45) Date of Patent: Mar. 31, 2026

(54) CATALYTIC REACTOR FOR CRACKING WAX IN WASTE PLASTIC PROLYSIS PROCESS, CATALYTIC COMPOSITION FOR CRACKING WAX IN WASTE PLASTIC PYROLYSIS PROCESS, AND PRODUCTION METHOD THEREOF

(71) Applicant: Infinity Environment Corp., Changwon-si (KR)

(72) Inventors: Youngsik Yoon, Yongin-si (KR); Hongdeok Jin, Changwon-si (KR)

(73) Assignee: Infinity Environment Corp., Changwon-si (KR)

( * ) Notice: Subject to any disclaimer, the term of this patent is extended or adjusted under 35 U.S.C. 154(b) by 220 days.

(21) Appl. No.: 18/463,328

(22) Filed: Sep. 8, 2023

(65) Prior Publication Data

US 2024/0109047 A1 Apr. 4, 2024

(30) Foreign Application Priority Data

Oct. 4, 2022 (KR) ........................ 10-2022-0126577
Oct. 4, 2022 (KR) ........................ 10-2022-0126578

(51) Int. Cl.
| | |
|---|---|
| *B01J 8/02* | (2006.01) |
| *B01J 6/00* | (2006.01) |
| *B01J 23/80* | (2006.01) |
| *B01J 23/94* | (2006.01) |
| *B01J 29/46* | (2006.01) |

(Continued)

(52) U.S. Cl.
CPC ............. *B01J 8/0278* (2013.01); *B01J 6/008* (2013.01); *B01J 8/0228* (2013.01); *B01J 8/0285* (2013.01); *B01J 23/80* (2013.01);

*B01J 23/94* (2013.01); *B01J 29/46* (2013.01); *B01J 29/7615* (2013.01); *B01J 29/90* (2013.01); *B01J 37/0221* (2013.01); *B01J 38/06* (2013.01); *C10B 53/07* (2013.01);

(Continued)

(58) Field of Classification Search
None
See application file for complete search history.

(56) References Cited

U.S. PATENT DOCUMENTS

| | | | | |
|---|---|---|---|---|
| 6,160,187 | A | * 12/2000 | Strickler | ............... C07C 29/106 |
| | | | | 568/867 |
| 6,662,735 | B2 | * 12/2003 | Tischer | ..................... F23G 5/24 |
| | | | | 110/224 |

(Continued)

FOREIGN PATENT DOCUMENTS

| | | |
|---|---|---|
| KR | 1020070095789 A | 3/2009 |
| KR | 1020100039928 B1 | 3/2012 |

(Continued)

*Primary Examiner* — Tam M Nguyen
(74) *Attorney, Agent, or Firm* — NKL LAW; Jae Youn Kim

(57) ABSTRACT

The present disclosure relates to a catalytic reactor for cracking wax of pyrolysis oil generated from waste plastic pyrolysis emulsification process, a catalytic composition and a production method thereof. Particularly, the present disclosure relates to a catalytic composition for cracking wax, including: a support that includes zeolite containing silicon oxide and aluminum oxide, and silica; and an active metal that includes iron and zinc, and is immersed in the support, thereby cracking carbides with C14 or more included in wax of pyrolysis oil generated during waste plastic emulsification process.

7 Claims, 9 Drawing Sheets

(51) Int. Cl.

| | | |
|---|---|---|
| *B01J 29/76* | (2006.01) | |
| *B01J 29/90* | (2006.01) | |
| *B01J 37/02* | (2006.01) | |
| *B01J 38/06* | (2006.01) | |
| *C10B 53/07* | (2006.01) | |
| *C10G 11/05* | (2006.01) | |

(52) U.S. Cl.
  CPC ..... *C10G 11/05* (2013.01); *B01J 2208/00026*
     (2013.01); *C10G 2300/1003* (2013.01)

(56) References Cited

U.S. PATENT DOCUMENTS

| | | | | |
|---|---|---|---|---|
| 2006/0201065 | A1* | 9/2006 | Lucas | ..................... B01F 25/23 |
| | | | | 422/607 |
| 2007/0073010 | A1* | 3/2007 | Pannell | ................. C08F 210/16 |
| | | | | 526/901 |
| 2010/0216896 | A1* | 8/2010 | Wang | ..................... C10G 2/342 |
| | | | | 518/700 |
| 2016/0045841 | A1* | 2/2016 | Kaplan | ................. C01B 17/027 |
| | | | | 429/49 |
| 2021/0130508 | A1* | 5/2021 | Krallis | ................. C08F 210/16 |
| 2024/0109047 | A1* | 4/2024 | Yoon | ........................ B01J 29/46 |

FOREIGN PATENT DOCUMENTS

| | | | |
|---|---|---|---|
| KR | 1020180002918 | B1 | 8/2018 |
| KR | 1020190125784 | B1 | 6/2020 |

* cited by examiner

| | Paraffin | ZSM–5 | ZSM–5 (5% Fe) | ZSM–5 (10% Fe) |
|---|---|---|---|---|
| Gas | – | 25.6 | 34.6 | 45.2 |
| C5–C12 | 2.9 | 18.8 | 52.7 | 41.2 |
| C14 or more | 97.1 | 55.6 | 12.8 | 13.5 |
| TOTAL | 100.0 | 100.0 | 100.0 | 100.0 |
| CRACKING RATE OF WAX WITH C14 OR MORE | – | 42.7 | 86.8 | 86.1 |

FIG. 8A

| | Paraffin | $\beta$–$H_2$ | $\beta$–$H_2$ (5% Fe) | $\beta$–$H_2$ (10% Fe) |
|---|---|---|---|---|
| Gas | – | 27.3 | 42.4 | 35.2 |
| C5–C12 | 2.9 | 54.4 | 47.7 | 49.9 |
| C14 or more | 97.1 | 18.4 | 9.8 | 14.8 |
| TOTAL | 100.0 | 100.0 | 100.0 | 100.0 |
| CRACKING RATE OF WAX WITH C14 OR MORE | – | 81.1 | 89.9 | 84.7 |

CATALYTIC REACTOR FOR CRACKING WAX IN WASTE PLASTIC PROLYSIS PROCESS, CATALYTIC COMPOSITION FOR CRACKING WAX IN WASTE PLASTIC PYROLYSIS PROCESS, AND PRODUCTION METHOD THEREOF

CROSS-REFERENCE TO RELATED APPLICATIONS

This application claims priority to and the benefit of Korea Patent Application Nos. 10-2022-0126577 and 10-2022-0126578 filed in the Korean Intellectual Property Office on Oct. 4, 2022, the contents of which are incorporated herein by reference in their entirety.

BACKGROUND

Technical Field

The present disclosure relates to a catalytic reactor for cracking wax of pyrolysis oil generated from waste plastic pyrolysis emulsification process, a catalytic composition and a production method thereof. Particularly, the present disclosure relates to a catalytic composition for cracking wax in a waste plastic pyrolysis process and a production method thereof, and to a catalytic reactor using the catalytic composition and a waste plastic pyrolysis system with the catalytic reactor.

Related Art

In South Korea, about 4 million tons of waste plastics are generated every year, but the recycling rate is low at 20-30%. As a result, a large amount of waste plastics is disposed of by landfill or incineration. However, landfilling waste plastics can leach out harmful components and are bulky compared to their unit weight, creating storage, transportation and landfill challenges. In addition, disposal by incineration can utilize some of the thermal energy generated during incineration, but it causes a lot of economic losses and environmental damage by releasing toxic gases, so there is a growing social interest in how to recycle waste plastics.

Waste plastics are primarily processed by energy recovery methods to recover the heat of combustion, for this, which is molded into a solid fuel, Refuse Plastic Fuel (RPF) and then fed into the furnace. Another option for processing waste plastics is recycling, which can be categorized into two main types: Mechanical Recycling, which involves melting the waste plastic at around 300° C. to create pelletized or granulated recycled particles, and Feedstock Recycling, which involves converting the waste plastic into material components needed to prepare other compounds. Among these methods, feedstock recycling is preferred as the final recycling method because the properties of the products produced by the process deteriorates with iteration of mechanical recycling. Feedstock recycling is broadly divided into pyrolysis, gasification, hydrogenation and solvolysis, and pyrolysis is the most actively researched. Pyrolysis oil generated from waste plastics through pyrolysis can be used in petroleum refining process as a feedstock for new chemicals or fuels.

Pyrolysis is one of feedstock recycling methods and is an environmentally friendly recycling method of waste plastics to pyrolyze the waste plastic under anoxic conditions and to produce oil, gas and the solid oxide (char).

In other words, the generation of waste plastics is constantly increasing around the world, pyrolysis technology can produce diesel fuel and lead sulfur raw material from the waste plastic and has the advantage of a large $CO_2$ reduction effect. The Ministry of Environment reported that it will increase the share of waste plastic pyrolysis treatment in Korea's waste plastic generation 100-fold from 0.1% to 10% by 2030.

In a typical waste plastic pyrolysis emulsification process, the waste plastic is fed into a pyrolysis reaction furnace, and the pyrolyzed gaseous oil vapor is condensed in a condensation unit (heat exchanger) in the downstream process and captured as pyrolysis oil.

Non-condensable gases of the components that cannot be condensed because the condensation temperature is lower than the temperature of the heat exchanger are released to the downstream reactor as pyrolysis gas. On the other hand, the oil vapor generated from the waste plastic pyrolysis has various types of hydrocarbon components, and these hydrocarbons have a wide range of carbon numbers, so the boiling and melting points of each component in the waste plastic pyrolysis oil vapor have a wide temperature range. The components of waste plastic pyrolysis components that are solid at room temperature are commonly referred to as wax.

During the waste plastic pyrolysis process, the heat exchanger is typically injected with room temperature coolant, and the wax, which is solid at room temperature, condenses solidifies on the outer wall of the heat exchanger, reducing heat transfer efficiency, and in the worst case, clogging the heat exchanger and stopping its operation. This is a common challenge in commercial-scale waste plastic pyrolysis.

Pyrolysis oil generated from pyrolysis emulsification process using waste plastics, contains about 20% wax by mass. As mentioned above, this wax is polymeric hydrocarbons with a carbon number of 28 or higher, which causes the pyrolysis oil to solidify in winter.

Commercially available diesel contains about 6~7% wax, so the minimum efficiency required for the catalytic process is in the range of 60~70%.

The wax contained theses waste plastics pyrolysis oil, about 20% by mass, causes the pyrolysis oil to lose it fluidity in winter, making it difficult to store and transport the produced product (pyrolysis oil).

Catalytic processes are required to crack the wax produced from waste plastics, but currently developed wax cracking catalysts are suitable for petrochemical processes. In order to produce catalysts with superior performance, it is necessary to optimize physicochemical properties of the catalyst, such as scattering point, surface area, etc.

It was necessary to develop catalysts that could convert the half of the wax contained in the waste plastic pyrolysis oil (20% by mass) in light oil or syngas.

RELATED ART DOCUMENT

Patent Document (Patent Document 1) Korean Patent No. 10-1130337
(Patent Document 2) Korean Patent No. 10-1890415
(Patent Document 3) Korean Patent No. 10-2124865
(Patent Document 4) Korean Patent Application Laid-Open No. 10-2009-0030465

SUMMARY

Technical Problem

Therefore, the present disclosure is contrived to overcome conventional problems as described above. According to an embodiment of the present disclosure, the aim is to provide a catalytic composition for cracking wax in a waste plastic pyrolysis process, and a production method thereof, thus reducing the wax in waste plastic pyrolysis oil from about 20% to 8% or less by mass to produce high-quality pyrolysis oil.

In addition, according to an embodiment of the present disclosure, the aim is to provide a catalytic composition for cracking wax in a waste plastic pyrolysis process, a catalytic reactor for cracking wax, and a waste plastic pyrolysis system with the catalytic reactor and a method thereof, thus operating a catalytic process that reduces the wax in waste plastic pyrolysis oil from about 20% to 8% or less by mass to produce high-quality pyrolysis oil.

According to an embodiment of the present disclosure, the aim is to provide a catalytic composition for cracking wax in a waste plastic pyrolysis, a catalytic reactor for cracking wax, and a waste plastic pyrolysis system with the catalytic reactor and a method thereof, so that a wax cracking process can be applied to the pyrolysis emulsification process using waste plastics to differentiate pyrolysis oil from pyrolysis oil produced by other companies and to produce high-quality pyrolysis oil.

Meanwhile, technical objects to be achieved in the present invention are not limited to the aforementioned technical objects, and other technical objects, which are not mentioned above, will be apparently understood to a person having ordinary skill in the art from the following description.

Technical Solution

A first aspect of the present disclosure may be achieved by providing, as a catalytic composition for cracking wax, a catalytic composition for cracking wax including: a support that includes zeolite containing silicon oxide and aluminum oxide; and an active metal that includes iron and zinc, and is immersed in the support.

In addition, the active metal further zinc.

Further, the zeolite is zeolite ZSM-5 or $\beta$-$H_2$, and the support further includes silica, and the iron is at least one of Fe, FeO, Fe3O4 and FeOOH.

In addition, the zeolite is 1~70 wt %, the silica is 1~70 wt %, the iron is 1~30 wt % and the zinc is 1~30 wt %.

Further, the catalyst cracks the wax in pyrolysis oil generated during a waste plastic emulsification process, and has a cracking rate of at least 84.5% for hydrocarbons with C14 or more.

A second aspect of the present disclosure may be achieved by providing a production method of a catalytic composition for cracking wax including a preparation step of a support that includes zeolite containing silicon oxide and aluminum oxide.

Further, a composition rate of the zeolite, iron and zinc is adjusted to control a cracking efficiency for hydrocarbons with C14 or more, and a production ratio of the final products, gases and light oil, and pyrolysis oil for sale is adjusted.

A third aspect of the present disclosure may be achieved by providing, as a catalytic reactor for cracking wax in a process for pyrolyzing waste plastics, a catalytic reactor for cracking wax in a waste plastic pyrolysis process including: a main body portion that is formed in a cylindrical shape; a pyrolysis oil inlet, which is provided on one side of the main body portion and allows pyrolysis oil gas in an oil vapor state generated as passing through a pyrolysis reaction furnace to be introduced; a catalyst bed portion, which is provided inside the main body portion and allows a wax absorption catalyst to be filled inside and reform wax inside the pyrolysis oil; an external heating portion that is integrally installed on the external surface of the main body portion and supplies thermal energy to the catalyst bed portion; and a pyrolysis oil outlet, which is provided on another side of the main body portion and allows the wax-reformed pyrolysis oil to be discharged.

A fourth aspect of the present disclosure may be achieved by providing, as an operation method of a catalytic reactor for cracking wax in a process for pyrolyzing waste plastics according to claim 1, an operation method of a catalytic reactor for cracking wax in a waste plastic pyrolysis process including: a supply step of thermal energy to a catalytic reactor through an external heating portion; an introduction step of pyrolysis oil in an oil vapor state generated as passing through a pyrolysis reaction furnace, to the inside of the catalytic reactor through a pyrolysis oil inlet which is provided on one side of a main body portion; a cracking step of hydrocarbons with C14 or more in wax in the pyrolysis oil by catalytic reaction as the pyrolysis oil passes through a catalyst bed portion which is provided inside a main body portion and in which a catalyst is filled; and a discharge step of the wax-reformed pyrolysis oil through a pyrolysis oil outlet provided on another side of the main body portion.

In addition, a combustion gas of 600~700° C. is supplied to the external heating portion, and the catalytic reactor is operated at a temperature of 370~400° C. inside.

Further, at the beginning of pyrolysis operation, water vapor generated by heating the water contained in the waste plastic is supplied to the inside of the catalytic reactor, a catalyst reactivation process is carried out, in which the water vapor passes through the catalyst bed portion and removes carbon deposited on the surface of the catalyst, and in the catalyst reactivation process, the catalytic reactor is operated at a temperature of 400~600° C. inside.

Advantageous Effects

According to a catalytic composition for cracking wax in a waste plastic pyrolysis process, and a production method thereof in accordance with an embodiment of the present disclosure, it is capable of reducing the wax in waste plastic pyrolysis oil from about 20% to 8% or less by mass to produce high-quality pyrolysis oil.

According to a catalytic composition for cracking wax in a waste plastic pyrolysis process, and a production method thereof in accordance with an embodiment of the present disclosure, it is capable of operating a catalytic process that reduces the wax in waste plastic pyrolysis oil from about 20% to 8% or less by mass to produce high-quality pyrolysis oil.

According to a catalytic composition for cracking wax in a waste plastic pyrolysis, a catalytic reactor for cracking wax, and a waste plastic pyrolysis system with the catalytic reactor and a method thereof in accordance with the present disclosure, it is capable of applying a wax cracking process to the pyrolysis emulsification process using waste plastics, so that pyrolysis oil can be differentiated from pyrolysis oil generated by other companies and high-quality pyrolysis oil can be produced.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

FIG. 8A is a table of results of a paraffin catalytic cracking experiment using zeolite ZSM-5 according to an experimental example of the present disclosure, FIG. 8B is a table of results of a paraffin catalytic cracking experiment using zeolite $\beta\text{-}H_2$ according to an experimental example according to the present disclosure.

DETAILED DESCRIPTION

Figure 1:
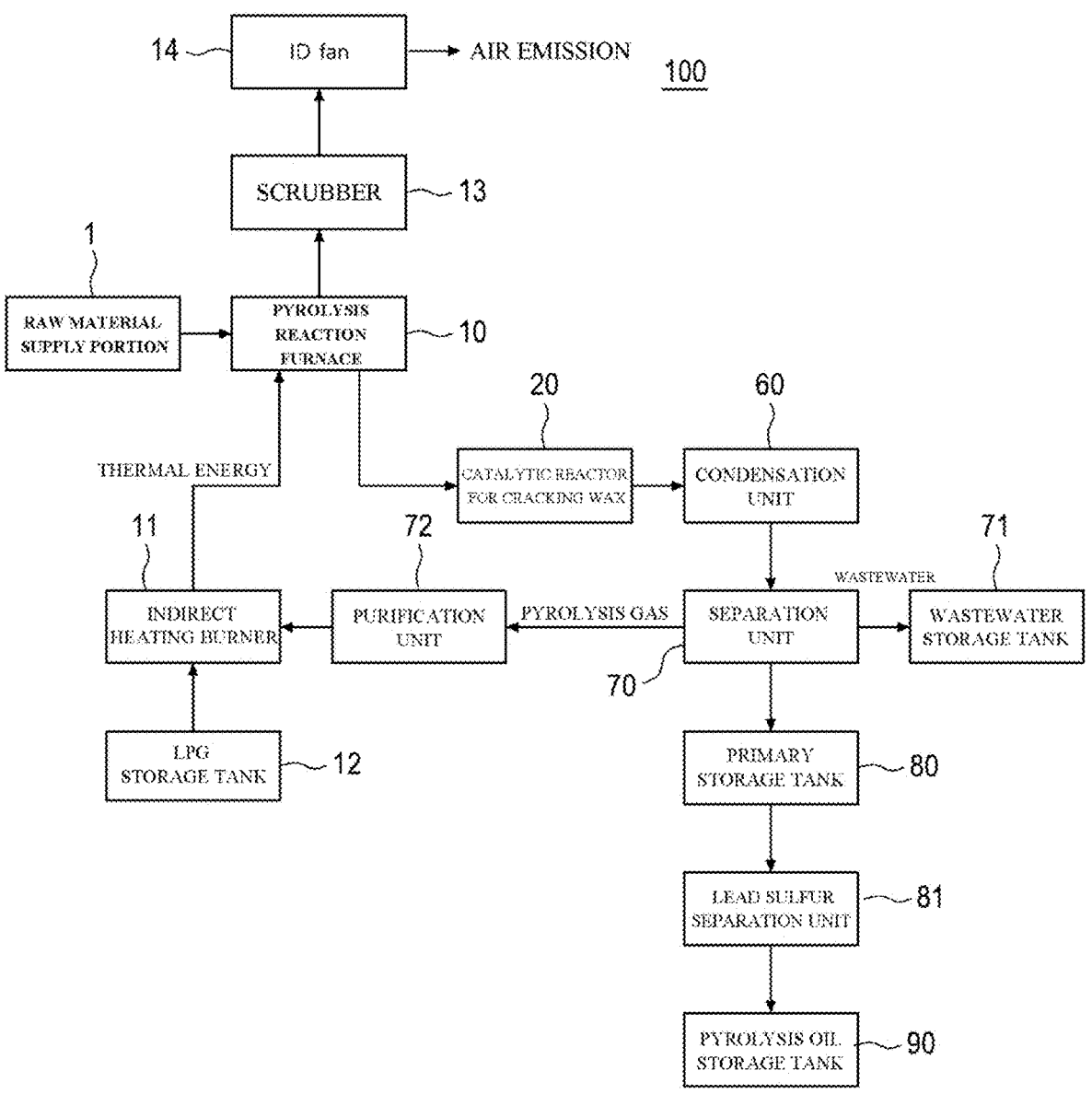
FIG. 1 is a schematic view of a waste plastic pyrolysis system with a catalytic reactor for cracking wax according to an embodiment of the present disclosure.

Hereinafter, the aforementioned aims, other aims, features and advantageous effects of the present disclosure will be understood easily referring to preferable embodiments related to the accompanying drawings. However, the present disclosure is not limited to embodiments described in this specification, and may be embodied into other forms. Preferably, the embodiments in this specification are provided in order to allow disclosed contents to be exhaustive and to communicate the concept of the present disclosure to those skilled in the art.

In this specification, when a certain element is placed on another element, this means that it may be formed directly thereon or that the third element may be interposed between them. Further, in the drawings, the thickness of an element may be overstated in order to explain the technical content thereof efficiently.

The embodiments described in this specification will explained with reference to a cross-sectional view and/or a plane view. In the drawings, the thickness of a film and a region may be overstated in order to explain the technical content thereof efficiently. Accordingly, the form of exemplary drawings for a fabrication method and/or an allowable error et cetera may be reformed. Thus, the embodiments according to the present disclosure are not limited to specific forms illustrated herein, but may include variations in the form resulting from the fabrication method. For example, the region illustrated with perpendicular lines may have a form to be rounded or with a predetermined curvature. Thus, regions exemplified in the drawings have attributes, and shapes thereof exemplify specific forms rather than limiting the scope of the present disclosure. In the various embodiments of this specification, terms such as 'first' and 'second' et cetera are used to describe various elements, but these elements should not be limited to such terms. These terms are merely used to distinguish one element from others. The embodiments explained and exemplified herein may include complementary embodiments thereto.

The terms used in this specification is to explain the embodiments rather than limiting the present disclosure. In this specification, the singular expression includes the plural expression unless specifically stated otherwise. The terms, such as 'comprise" and/or "comprising" do not preclude the potential existences of one or more elements.

When describing the following specific embodiments, various kinds of specific contents are made up to explain the present disclosure in detail and to help understanding thereof. However, it will be apparent for those who have knowledge to the extent of understanding the present disclosure that the present disclosure can be used without any of these specific contents. In a certain case when describing the present disclosure, the content that is commonly known to the public but is largely irrelevant to the present disclosure is not described in order to avoid confusion.

Hereinafter, a catalyst composition for cracking wax in a waste plastic pyrolysis process according to an embodiment of the present disclosure, and a production method thereof will be described. Prior to the description of the catalytic composition, the structure and function of a catalytic reactor for cracking wax in a waste plastic pyrolysis according to an embodiment of the present disclosure, and a waste plastic pyrolysis system with the catalytic reactor for cracking wax and a process operation method will be described.

Figure 2:
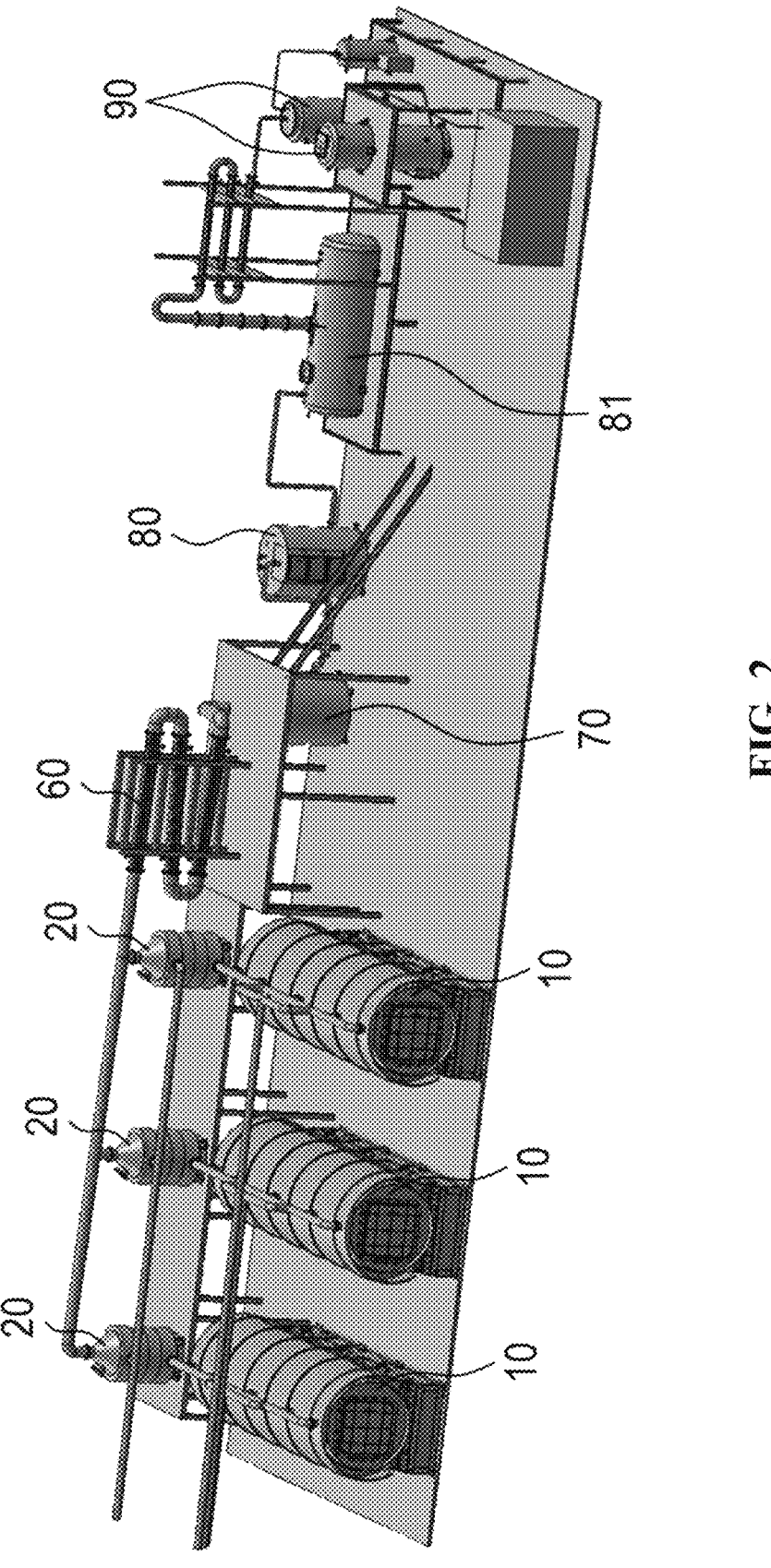
FIG. 2 is a perspective view of a waste plastic pyrolysis system with a catalytic reactor for cracking wax according to an embodiment of the present disclosure.

FIG. 1 is a schematic view of a waste plastic pyrolysis system with a catalytic reactor for cracking wax according to an embodiment of the present disclosure. FIG. 2 is a perspective view of a waste plastic pyrolysis system with a catalytic reactor for cracking wax according to an embodiment of the present disclosure.

Figure 3:
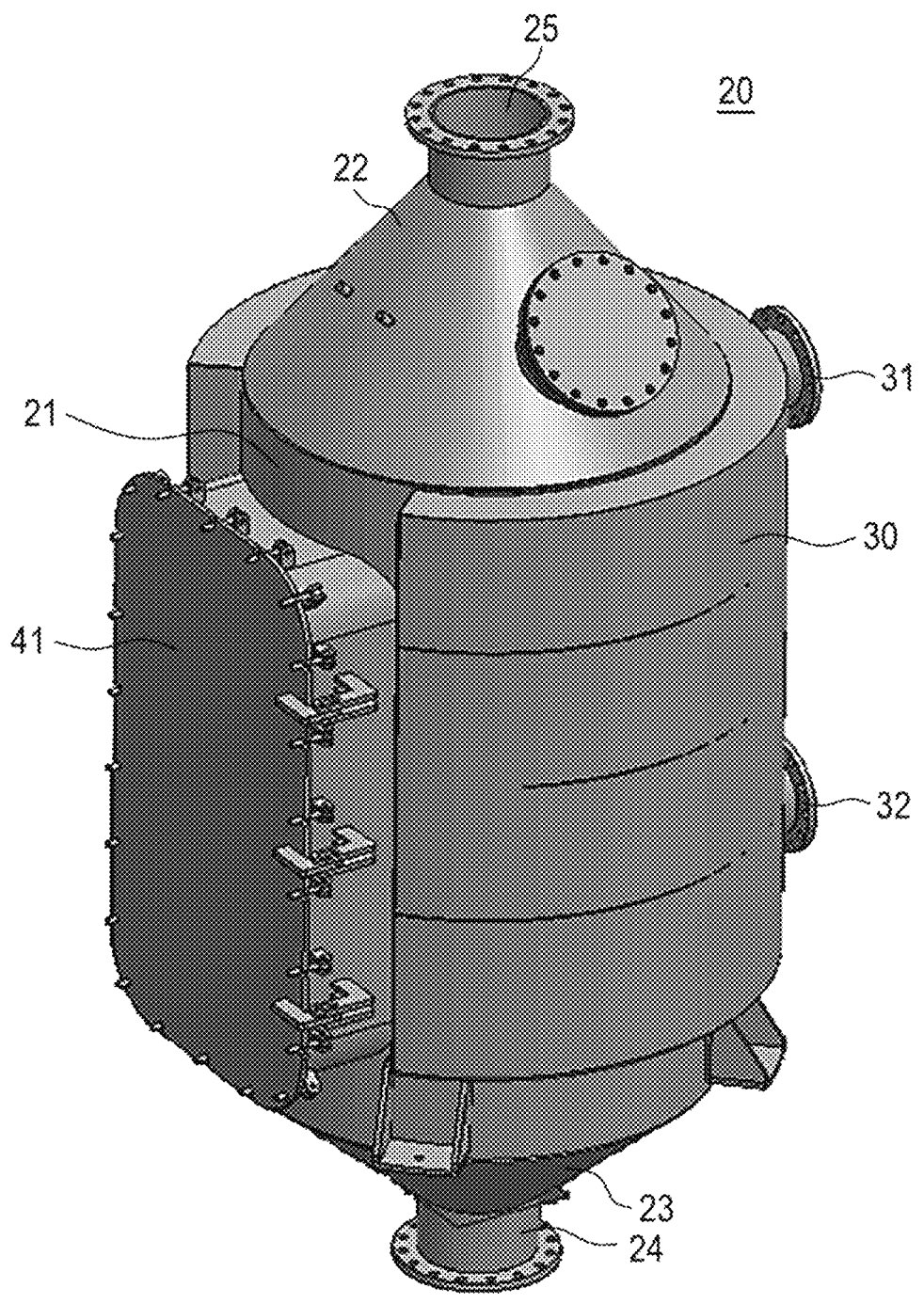
FIG. 3 is a perspective view of a catalytic reactor for cracking wax in a waste plastic pyrolysis process according to an embodiment of the present disclosure.
Figure 4:
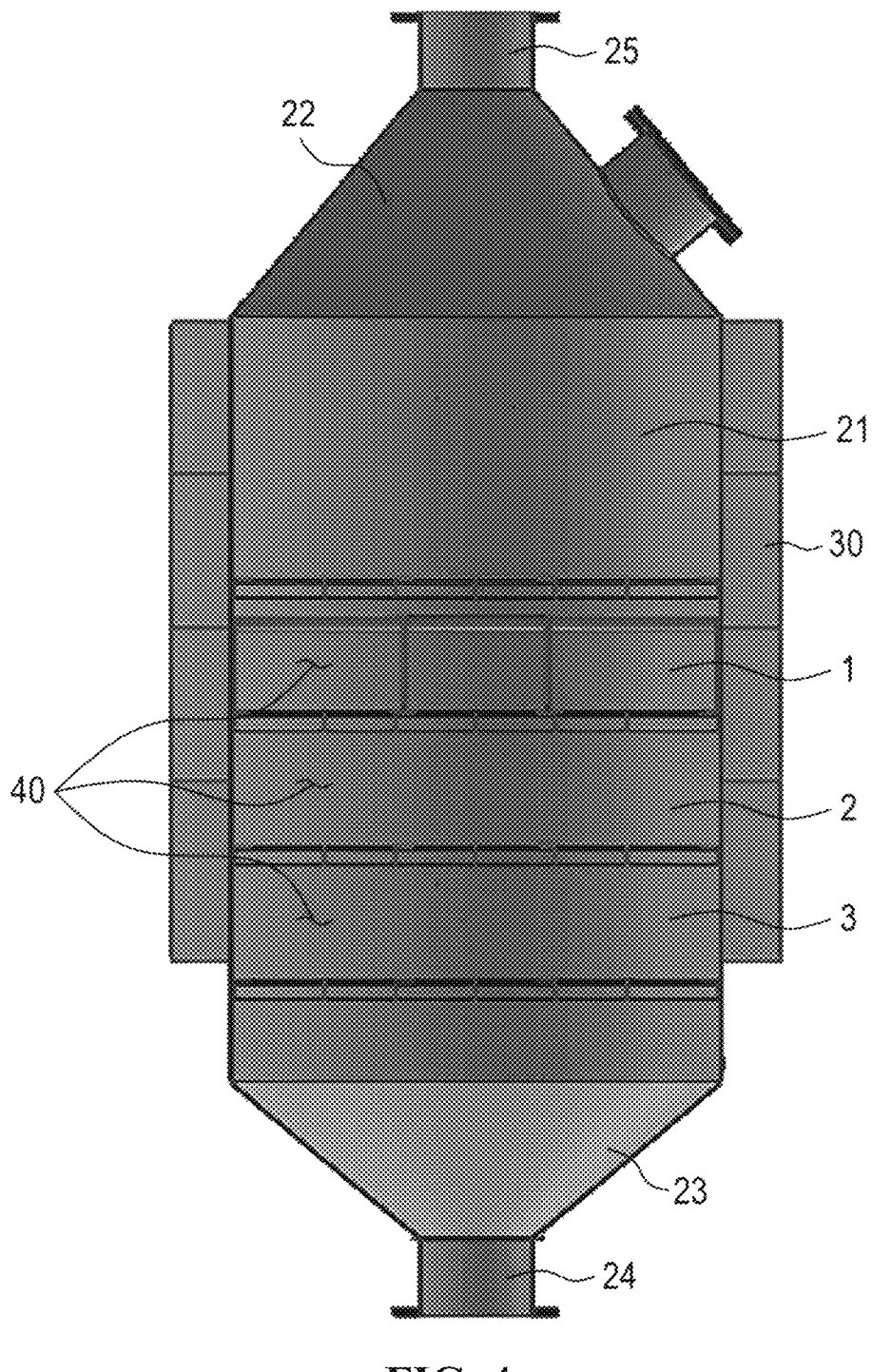
FIG. 4 is a cross-sectional view of a catalytic reactor for cracking wax in a waste plastic pyrolysis process according to an embodiment of the present disclosure.
Figure 5:
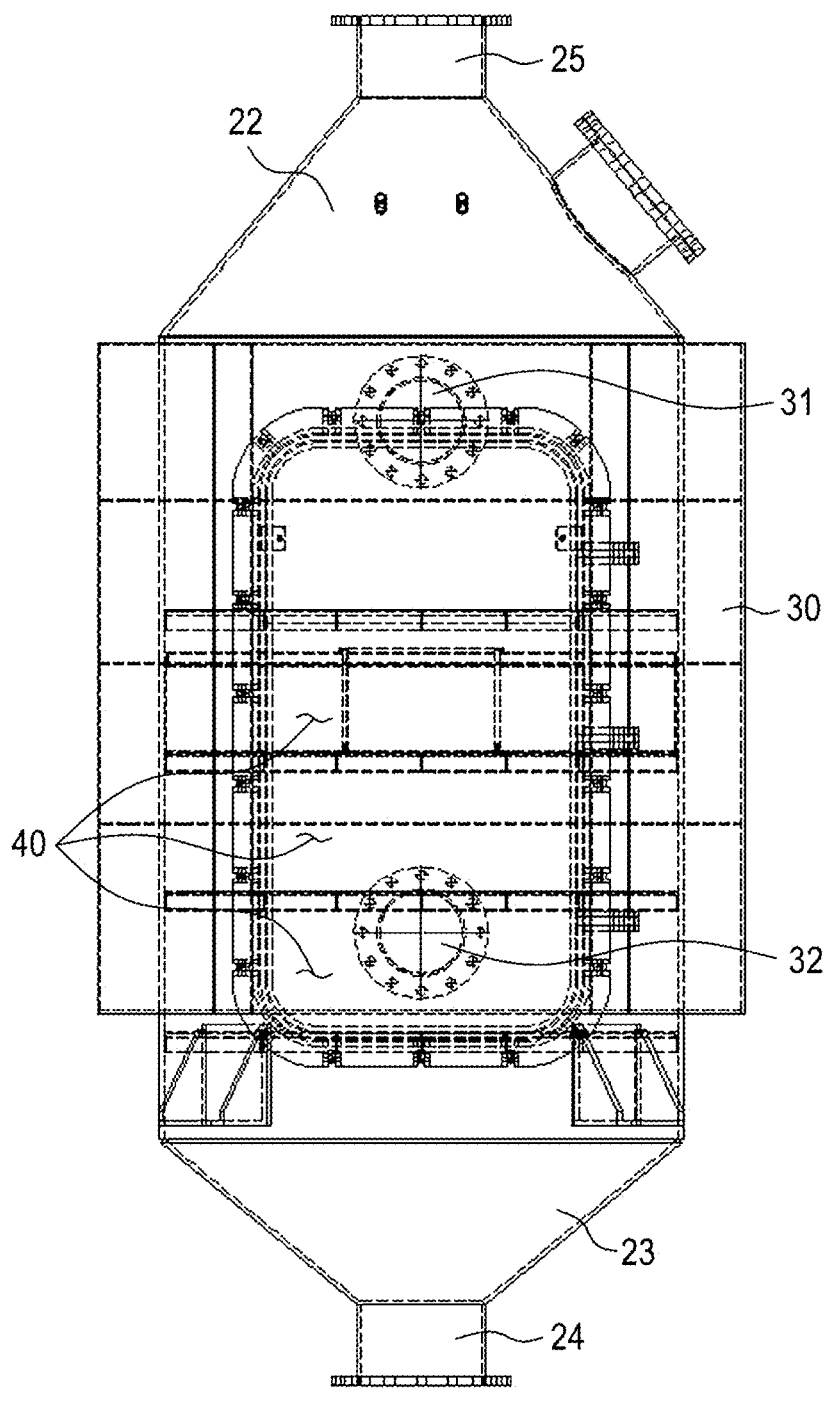
FIG. 5 is a perspective front view of a catalytic reactor for cracking wax in a waste plastic pyrolysis process according to an embodiment of the present disclosure.
Figure 6:
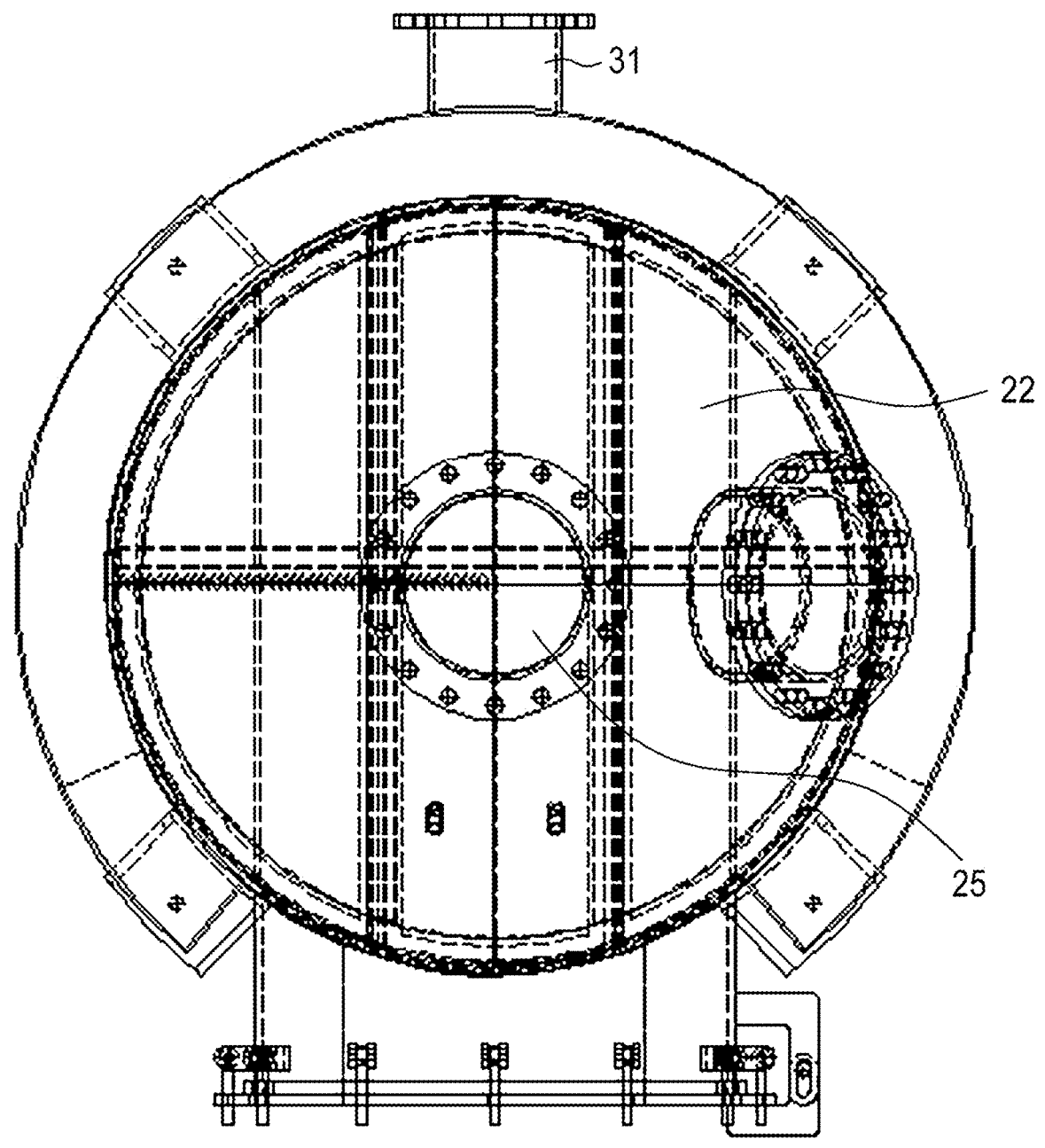
FIG. 6 is a plane view of a catalytic reactor for cracking wax in a waste plastic pyrolysis process according to an embodiment of the present disclosure.

FIG. 3 is a perspective view of a catalytic reactor for cracking wax in a waste plastic pyrolysis process according to an embodiment of the present disclosure and FIG. 4 is a cross-sectional view of a catalytic reactor for cracking wax in a waste plastic pyrolysis process according to an embodiment of the present disclosure. Further, FIG. 5 is a perspective front view of a catalytic reactor for cracking wax in a waste plastic pyrolysis process according to an embodiment of the present disclosure. Yet further, FIG. 6 is a plane view of a catalytic reactor for cracking wax in a waste plastic pyrolysis process according to an embodiment of the present disclosure.

Figure 7:
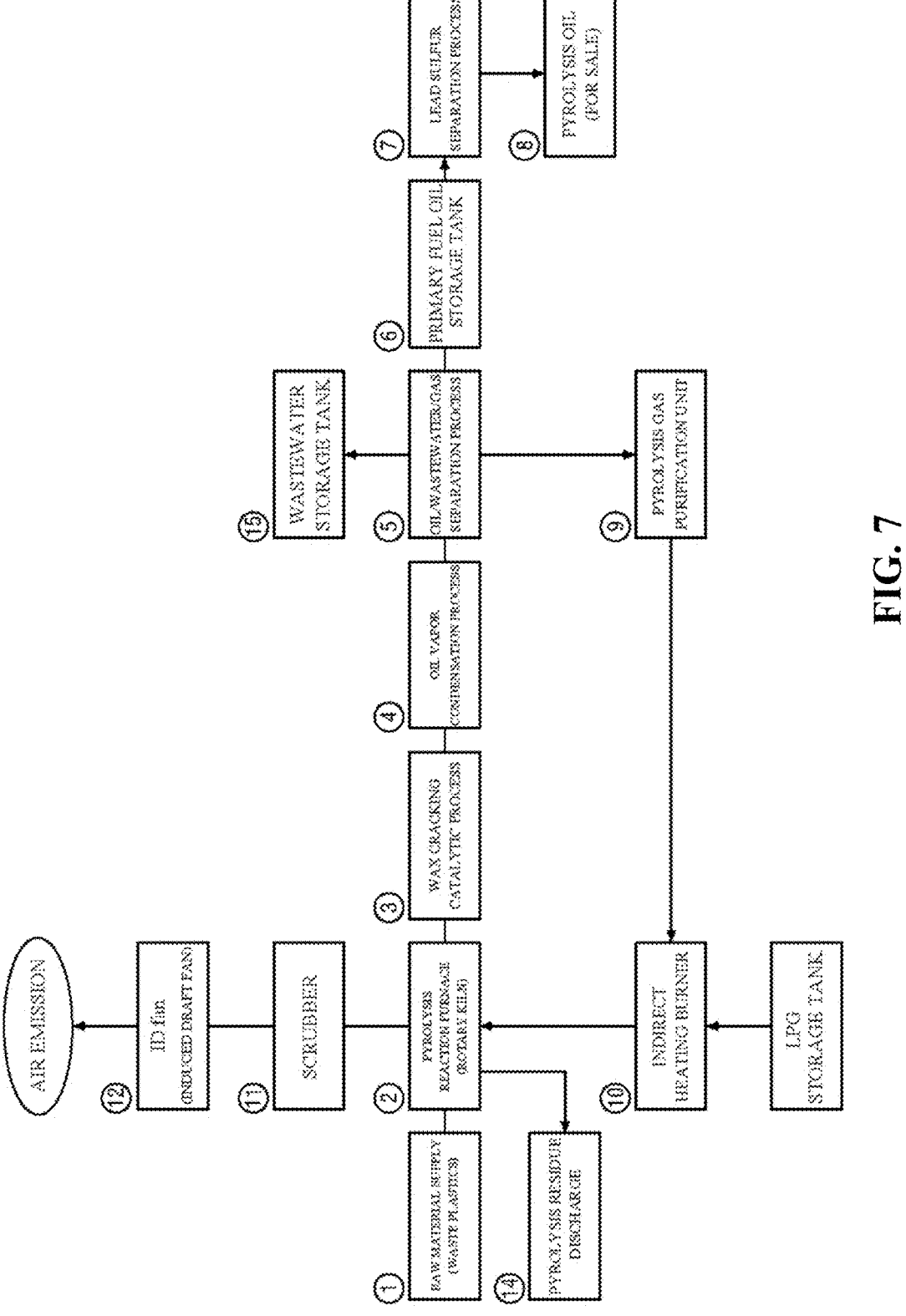
FIG. 7 is a process flowchart of a waste plastic pyrolysis system with a catalytic reactor for cracking wax according to an embodiment of the present disclosure.

FIG. 7 is a process flowchart of a waste plastic pyrolysis system with a catalytic reactor for cracking wax according to an embodiment of the present disclosure.

A waste plastic pyrolysis system with a catalytic reactor for cracking wax 100 according to an embodiment of the present disclosure is for conducting a biochar waste plastic emulsification process, which, as shown in FIG. 1 and FIG. 7, includes a raw material supply portion 1, a pyrolysis reaction furnace 10, an indirect heating burner 11, a catalytic reactor for cracking wax 20, a condensation unit 60, a separation unit 70, a purification unit 72, a wastewater storage tank 71, a primary storage tank 80, a lead yean separation unit 81, a pyrolysis oil storage tank 70, etc.

First, waste plastics are fed into the pyrolysis reaction furnace 10 through the raw material supply portion 1. In the pyrolysis reaction furnace 10, a cracking process of the waste plastic as a raw material is carried out by applying heat in the absence of air.

The main products of an emulsification process in the pyrolysis reaction furnace 10 are flammable gas, pyrolysis oil, pyrolysis oil in an oil vapor state, pyrolysis residue, etc. The flammable gas, as shown in FIG. 7, is filtered by a scrubber 13 through an induced draft fan 14 (referred to as ID fan) and emitted to the atmosphere.

The pyrolysis residue is separated separately, and the pyrolysis oil in an oil vapor state discharged from the pyrolysis oil emulsification process is introduced into the downstream catalytic reactor 20.

As shown in FIG. 1 and FIG. 2, thermal energy required for the pyrolysis reaction furnace 10 according to an embodiment of the present disclosure is supplied by the indirect heating burner 11. As will be described later, the main fuel of the indirect heating burner 11 is supplied from an LPG storage tank 12, but the indirect heating burner can be supplied with purified pyrolysis gas which is separated by the separation unit 70 in the downstream process and then purified by a purification unit 72.

The catalytic reactor for cracking wax in a pyrolysis emulsification process 20 according to an embodiment of the present disclosure is installed at a downstream portion of the pyrolysis reaction furnace 10 in the pyrolysis emulsification process and plays a role in reforming wax components in pyrolysis oil discharged from the pyrolysis reaction furnace in an oil vapor state.

The catalytic reactor for cracking wax in a pyrolysis 20 process according to an embodiment of the present disclosure includes: a main body portion 21 formed in a cylindrical shape; a pyrolysis oil inlet 24, which is provided on one side of the main body portion 21 and allows pyrolysis gas in an oil vapor state generated as passing through the pyrolysis reaction furnace 10; a catalyst bed portion 40, which is provided inside the main body portion 21 and allows a wax absorption catalyst to be filled inside and reform wax inside the pyrolysis oil; an external heating portion 30 that is integrally installed on the external surface of the main body portion 11 and supplies thermal energy to the catalyst bed portion; and a pyrolysis oil outlet 25, which is provided on another side of the main body portion 11 and allows the wax-reformed pyrolysis oil to be discharged.

Further, as shown in FIG. 3 and the like, a lower cone 23 having a diameter gradually decreasing downwardly is connected to the lower end of the main body portion 21, and the pyrolysis oil outlet 25 is located at the lower end of this lower cone 23. Yet further, an upper cone 22 is having a diameter gradually decreasing upwardly is connected to the main body portion 21, and the pyrolysis oil inlet 24 is located at the upper end of this upper cone 22. Therefore, the pyrolysis oil in an oil vapor state discharged from the pyrolysis reaction furnace 10 is introduced into the lower end of the catalytic reactor 20, passing through the interior, and then being discharged to the upper end.

The catalyst bed portion 40 according to an embodiment of the present disclosure is the catalyst bed portion is installed in the main body portion in multiple layers, and each of the layers has a drawer in which the catalyst filled and which is detachable.

As shown in FIG. 4 and FIG. 5, the catalyst bed portion 40 has a three-layer structure, with three drawers in each layer to facilitate replacement and management of the catalyst. Further, a door is installed for opening and closing this catalyst bed portion 40.

In addition, a heat sink is installed inside the external heating portion 30 according to an embodiment of the present disclosure and combustion gas is supplied to the inside. A control portion controls temperature of the external heating portion 30 to adjust the internal temperature of the catalytic reactor 20.

Thermal energy is supplied to the catalytic reactor through the external heating portion 30, and the pyrolysis oil in an oil vapor generated as passing through the pyrolysis reaction furnace 10 is introduced into the interior through the pyrolysis oil inlet 24 at the lower end of the main body portion 21.

Further, the wax in the pyrolysis oil is reformed to have a carbon number of 10~20 by a catalytic reaction as passing through the multiple layered catalyst bed portion 40 provided inside the main body portion 21.

In addition, the wax-reformed pyrolysis oil is discharged through the pyrolysis oil outlet 25 provided on the upper side of the main body portion 21.

In this normal operation state, combustion gas of 600~700° C. is supplied to the external heating portion 30 and the catalytic reactor 100 is operated 370~400° C. inside.

Further, the catalyst used for cracking wax can be temporarily degraded in activity and performance due to carbon deposition on the surface thereof, and an operation is required to reactivate the catalyst.

Therefore, in a catalyst reactivation method according to an embodiment of the present disclosure, at the beginning of a biochar process operation, moisture contained in the waste plastic, which is a raw material, is heated and discharged as water vapor. The discharged water vapor passes through the interior of the catalytic reactor.

The carbon deposited on the surface of the catalyst used for a long time, is removed by the water vapor that is discharged from the pyrolysis reaction furnace 10 at the beginning of the operation of the process, and at this time, the temperature inside the catalytic reactor 20 is controlled within a range of 400~600° C.

After the wax reforming is completed, the pyrolysis oil discharged from the catalytic reactor 20 is subjected to an oil vapor condensation process by the condensation unit 60.

Then, the pyrolysis oil that has passed through the condensation unit 60 is subjected to a process of separating wastewater, pyrolysis gas and pyrolysis oil by the separation unit 70. At this time, the separated wastewater is stored in the wastewater storage tank 71, the separated pyrolysis oil is, as mentioned above, is subjected to a pyrolysis oil purification process by the purification unit 72, and then can be used as an auxiliary fuel for the indirect heating burner 11.

In addition, the pyrolysis oil from which the wastewater and pyrolysis gas is separated is primarily stored in the primary storage tank 80.

Then, after separating lead sulfur from the pyrolysis oil by the lead sulfur separation unit 81, the pyrolysis oil for sale is finally stored in the pyrolysis oil storage tank 90.

Hereinafter, the composition and production method of a catalytic composition filled in the catalyst bed portion 40 of the catalytic reactor for cracking wax in a waste plastic pyrolysis process according to an embodiment of the present disclosure will be described.

A catalytic composition for cracking wax, which is filled in the catalyst bed portion 40, may include: a support composed of zeolite; 1~30 wt % of Fe loaded on the support; and 1~30 wt % of Zn loaded on the support.

More particularly, a catalytic composition is applied, which uses, as a support, zeolite that is a mineral containing silicon oxide ($SiO_2$) and aluminum oxide ($Al_2O_3$), wherein a content of iron (Fe), iron oxide (FeO), ferric oxide ($Fe_2O_3$), ferrous oxide ($Fe_3O_4$) is 1~30% by mass and a content of zinc oxide (ZnO) is 1~30% by mass.

The silica-based zeolite according to an embodiment of the present disclosure may be zeolite ZSM-5 or $\beta$-$H_2$ and the support may further include silica. The iron is at least one of Fe, FeO, Fe3O4 and FeOOH, and the zinc is ZnO.

The catalytic composition for cracking wax according to an embodiment of the present disclosure may include the zeolite 1~70 wt %, the silica 1~70 wt %, the iron 1~30 wt % and the zinc 1~30 wt %.

The catalytic composition for cracking wax according to an embodiment of the present disclosure has a cracking rate of at least 84.5% for hydrocarbons with C14 or more contained in the wax in pyrolysis oil generated during a waste plastic emulsification process.

The zeolite has a cracking function of hydrocarbons as a catalyst, however, it may not be suitable for a process to obtain hydrocarbons in a liquid state because it cracks hydrocarbons in a liquid state to a gaseous state due to it superior cracking performance.

In an embodiment of the present disclosure, the hydrocarbon cracking function of the zeolite is regulated according to a surface application method of Fe and Zn components, so that is a function of selectively cracking polymeric hydrocarbons with carbon number of 28 or more, such as wax.

In a production of a catalytic composition for cracking wax according to an embodiment of the present disclosure, zeolite corresponding to a support is prepared first.

Then, a catalyst composition is produced by physically applying an active metal with iron and zinc components to the support.

Further, in an embodiment of the present disclosure, as obtaining optimizing physiochemical properties through cracking functions according to the method of adding Fe and Zn components, a catalyst can be produced, which has excellent activity (wax conversion rate) and stability.

Hereinafter, experiment results of a catalytic composition for cracking wax according to an embodiment of the present disclosure, as mentioned above will be described.

Figure 9:
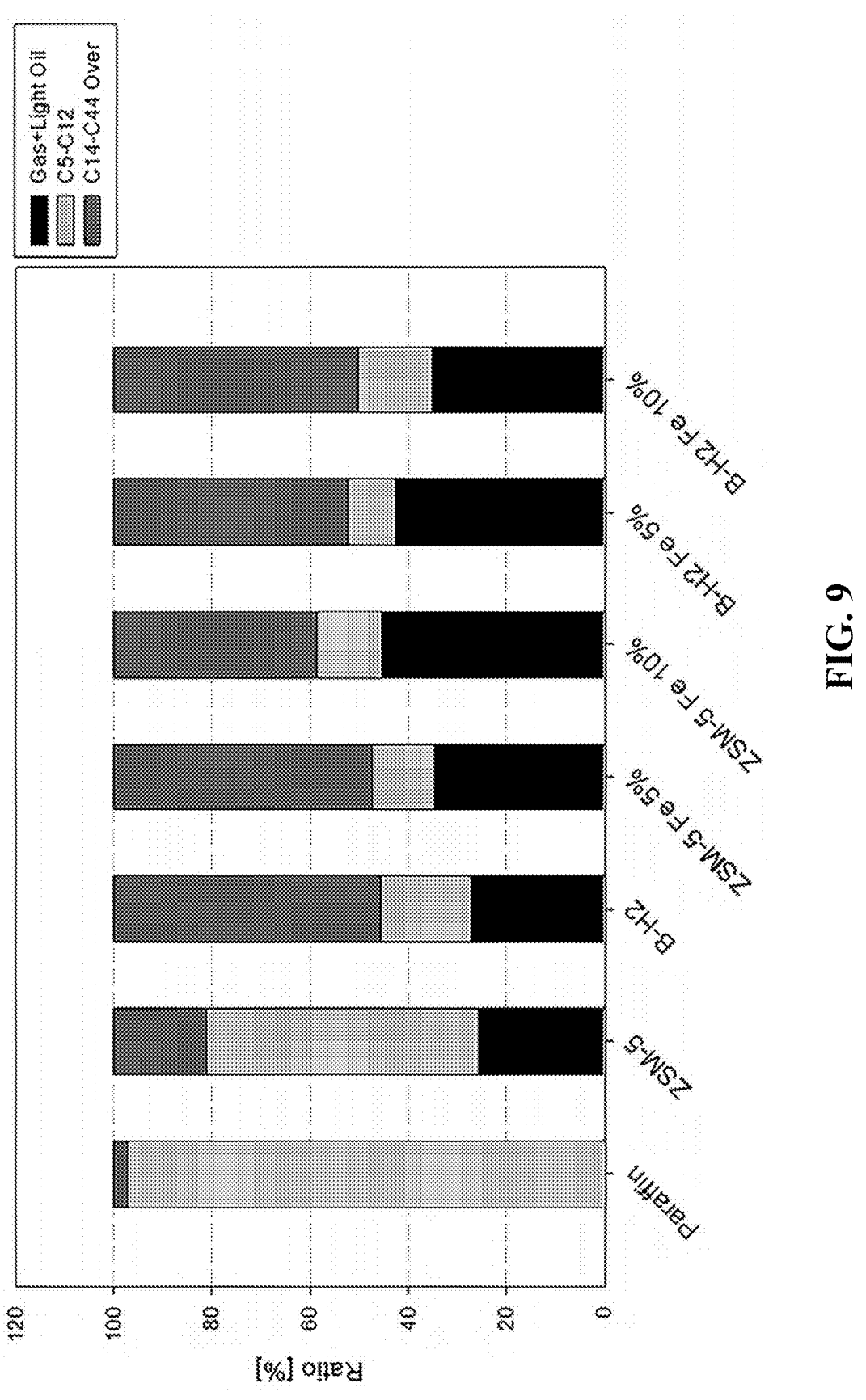
FIG. 9 is a graph of results of a paraffin catalyst performance experiment according to an experimental example of the present disclosure.

FIG. 8A is a table of results of a paraffin catalytic cracking experiment using zeolite ZSM-5 according to an experimental example of the present disclosure. FIG. 8B is a table of results of a paraffin catalytic cracking experiment using zeolite $\beta$-$H_2$ according to an experimental example according to the present disclosure. Further, FIG. 9 is a graph of results of a paraffin catalyst performance experiment according to an experimental example of the present disclosure.

In an experimental example of the present disclosure, a wax (paraffin) cracking experiment was conducted at a reaction temperature of 370° C. using a catalyst with zeolite as a main component.

Iron (Fe) has a hydrocarbon cracking effect. particularly, its effectiveness in cracking hydrocarbons increases the closer it is to the reduced state, such as $Fe_3O_4$, FeOOH, and Fe, rather than $Fe_2O_3$.

In the experimental example of the present disclosure, each support of zeolite ZSM-5 and zeolite $\beta$-$H_2$, without impregnation with iron (Fe) was compared to those when impregnated with 5 wt % and 10 wt % of iron respectively.

As shown in FIGS. 8A, 8B and 9, the target performance of cracking efficiency for hydrocarbons with C14 or more is 60% or more, and it can be seen that impregnation with Fe increases the cracking efficiency for hydrocarbons with C14 or more in all catalysts compared to no impregnation.

As shown in FIG. 8A and FIG. 9, when zeolite ZSM-5 was impregnated with 5% and 10% of Fe, it can be seen that cracking rates for waxes with C14 or more are 86.8% and 86.1%, respectively. In addition, as shown in FIG. 8b and FIG. 9, zeolite $\beta$-$H_2$ was impregnated with 5% and 10% of Fe, cracking rates for waxes with C14 are 89.9% and 84.7%.

According to a catalytic composition for cracking wax in accordance with an embodiment of the present disclosure, a wax component in pyrolysis oil produced from a pyrolysis emulsification process is cracked into gas or light oil to regulate the production yield of non-condensable gas or lead sulfur (light oil) that can be applied to a hydrogen production process.

Ultimately, as mixing the zeolite impregnated with Fe and silica-based supports, the cracking efficiency for hydrocarbons with C14 or more is controlled, allowing production rates of gas, light oil, and pyrolysis oil for sale as end products.

Fe is contained at 1~30% by mass, which has a selective cracking efficiency for hydrocarbons with C14 or more.

Further, zeolite is contained at 1~70% by mass, which has the cracking effect for hydrocarbons and plays the role of a support to maintain strength.

In addition, silica is contained at 1~70%, which plays the roles of a mixing agent to control the cracking efficiency of the catalyst and of a support to maintain strength.

Furthermore, the apparatus and methods described above are not intended to be limited to the configurations and methods of the embodiments described above, but may be configured with optional combinations of all or portions of each embodiment so that various variations may be made.

FIGURE REFERENCE NUMBERS

1: raw material supply portion
10: pyrolysis reaction furnace
11: indirect heating burner
12: LNG storage tank
13: scrubber
14: induced draft fan
20: catalytic reactor for cracking wax
21: main body portion
22: upper cone
23: lower cone
24: pyrolysis oil inlet
25: pyrolysis oil outlet
30: external heating portion
31: combustion gas inlet
32: combustion gas outlet
40: catalyst bed portion
41: door
60: condensation unit
70: separation unit
71: wastewater storage tank
72: purification unit
80: primary storage tank
81: lead sulfur separation unit
90: pyrolysis oil storage tank
100: waste plastic pyrolysis system with a catalytic reactor

The invention claimed is:

1. As a catalytic reactor for cracking wax in a process for pyrolyzing waste plastics, a catalytic reactor for cracking wax in a waste plastic pyrolysis process comprising:

a main body portion that is formed in a cylindrical shape;

a pyrolysis oil inlet, which is provided on one side of the main body portion and allows pyrolysis oil gas in an oil vapor state generated as passing through a pyrolysis reaction furnace to be introduced;

a catalyst bed portion, which is provided inside the main body portion and allows a wax absorption catalyst to be filled inside and reform wax inside the pyrolysis oil;

an external heating portion that is integrally installed on the external surface of the main body portion and supplies thermal energy to the catalyst bed portion;

a pyrolysis oil outlet, which is provided on another side of the main body portion and allows the wax-reformed pyrolysis oil to be discharged;

a lower cone having a diameter gradually decreasing downwardly at a lower end of the main body portion and having the pyrolysis oil outlet;

an upper cone having a diameter gradually decreasing upwardly at an upper end of the main body portion ad having the pyrolysis oil inlet; and a control portion that controls temperature of the external heating portion to adjust the internal temperature of the catalytic reactor, wherein at the beginning of pyrolysis operation, water vapor generated by heating the water contained in the waste plastic is supplied to the inside of the catalytic reactor, and a catalyst reactivation process is carried out, in which the water vapor passes through the catalyst bed portion and removes carbon deposited on the surface of the catalyst.

2. The catalytic reactor for cracking wax in a waste plastic pyrolysis process of claim 1, wherein the catalyst comprises:

a support that includes zeolite containing silicon oxide and aluminum oxide, and silica; and an active metal that includes iron and zinc, and is immersed in the support, wherein the zeolite is 1~70 wt %, the silica is 1~70 wt %, the iron is 1~30 wt % and the zinc is 1~30 wt %, the catalyst is filled in a catalytic reactor for cracking wax in a process for pyrolyzing waste plastics, the catalyst bed portion is installed in the main body portion in multiple layers, each of the layers has a drawer in which the catalyst filled and which is detachable, a combustion gas of 600~700° C. is supplied to the external heating portion, and the catalytic reactor is operated at a temperature of 370~400° C. inside.

3. The catalytic reactor for cracking wax in a waste plastic pyrolysis process of claim 2, wherein the zeolite is zeolite ZSM-5 or $\beta$-H$_2$, and the iron is at least one of Fe, FeO, Fe3O4 and FeOOH.

4. The catalytic reactor for cracking wax in a waste plastic pyrolysis process of claim 1, wherein the catalyst cracks the wax in pyrolysis oil generated during a waste plastic emulsification process, and has a cracking rate of at least 84.5% for hydrocarbons with C14 or more contained in the wax.

5. As a waste plastic system, a waste plastic pyrolysis system with a catalytic reactor comprising:

a pyrolysis reaction furnace that generates pyrolysis oil in an oil vapor state, flammable gas and carbides by pyrolyzing waste plastics;

a catalytic reactor that reforms wax in pyrolysis oil of the pyrolysis reaction furnace according to claim 1;

a condensation unit that condenses the pyrolysis oil discharged from the catalytic reactor;

a separation unit that separates wastewater and pyrolysis gas from the pyrolysis oil that has passed through the condensation unit; and a storage tank that stores the separated pyrolysis oil.

6. The waste plastic pyrolysis system with a catalytic reactor of claim 5, further comprising:

an indirect heating burner that supplies a pyrolysis heat source to the pyrolysis reaction furnace; and a purification unit that purifies the pyrolysis gas separated by the separation unit, wherein the pyrolysis gas, which is purified in the purification unit, is supplied to the indirect heating burner.

7. The waste plastic pyrolysis system with a catalytic reactor of claim 6, wherein the storage tank comprises:

a primary storage tank that stores the pyrolysis oil separated by the separation unit;

a lead sulfur separation unit that separates lead sulfur from the pyrolysis oil; and a pyrolysis oil storage tank that stores pyrolysis oil for sale.

* * * * *